United States Patent Office 2,770,075
Patented Nov. 13, 1956

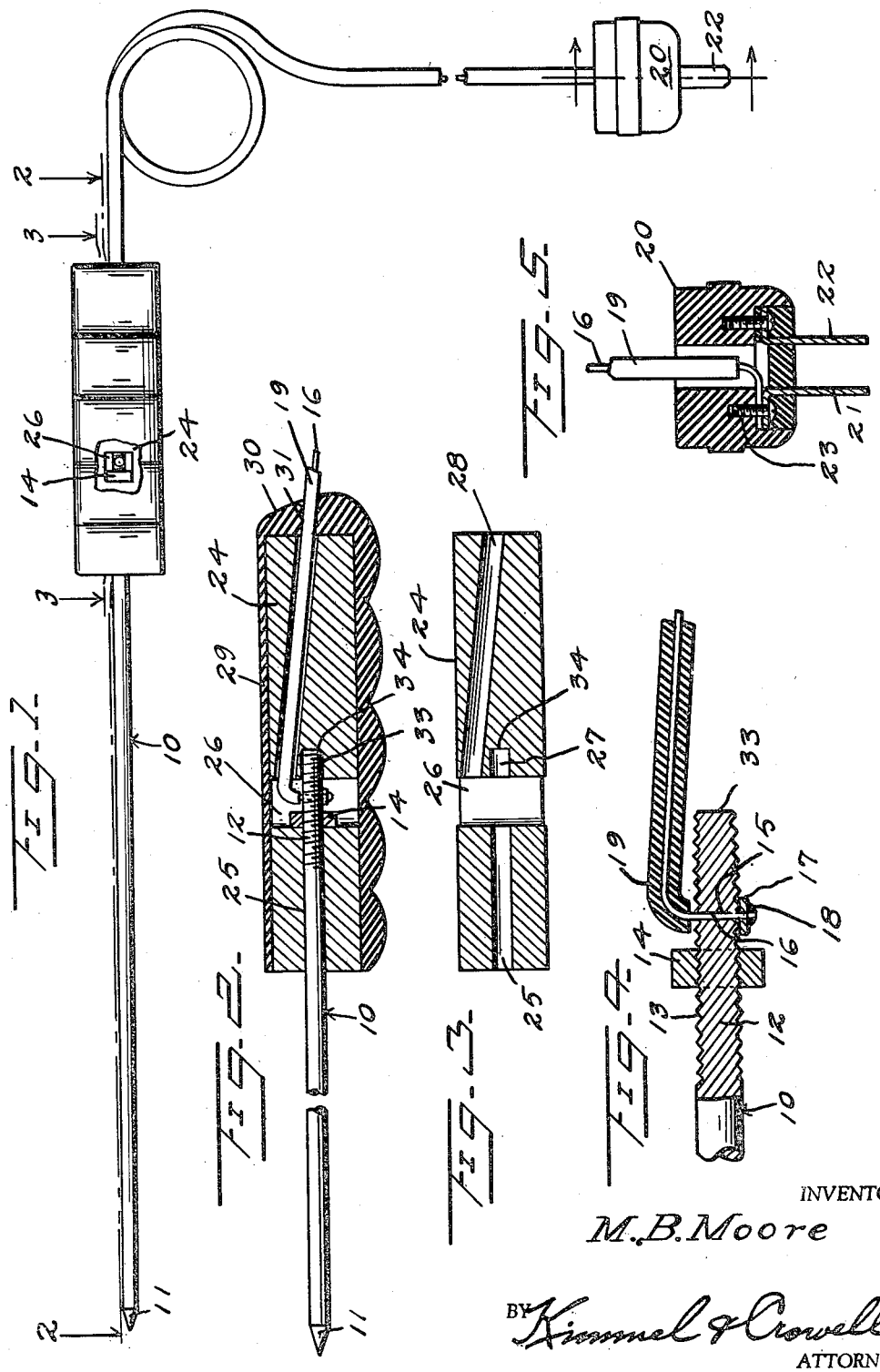

2,770,075
ELECTRIC BAIT GETTER
Maurice B. Moore, Rushville, Ill.
Application July 26, 1955, Serial No. 524,469
1 Claim. (Cl. 47—1.3)

The present invention relates to an electric bait getter, and more particularly to a device for electrically charging a portion of the earth's surface so as to cause worms and other animal life contained therein to come to the surface where they may be easily caught.

The primary object of the invention is to provide an electric bait getter which can be used with any source of electricity and may be inserted into the ground without endangering the operator.

A further object of the invention is to provide a bait getter of the class described which will be inexpensive to manufacture, simple to use and relatively easy to maintain.

Other objects and advantages will become apparent in the following specification when considered in the light of the attached drawings, in which:

Figure 1 is a bottom plan view of the invention shown partly in section for purposes of clarity;

Figure 2 is an enlarged longitudinal cross section of the invention taken along the line 2—2 of Figure 1, looking in the direction of the arrows;

Figure 3 is an enlarged longitudinal cross section of the handle member with the other parts removed, taken along the line 3—3 of Figure 1, looking in the direction of the arrows;

Figure 4 is an enlarged detail fragmentary cross sectional view of the attachment of the wire to the electrode rod, and Figure 5 is a vertical cross section of the plug taken along the line 5—5 of Figure 1, looking in the direction of the arrows.

Referring now to the drawings in detail wherein like reference numerals indicate like parts throughout the several figures, the reference numeral 10 indicates generally an electrode which is adapted for insertion into the ground. The electrode 10 is provided at one end with a point 11 to facilitate the insertion of the electrode 10 into the ground. The opposite end 12 of the electrode 10 is screw-threaded, as at 13, to receive an internally screw-threaded nut 14. A bore 15 extends transversely of the threaded end 12 of the electrode 10 and is adapted to receive a wire 16 which extends therethrough. A washer 17 is positioned over the free end of the wire 16, and the wire 16 and washer 17 are soldered as at 18 to secure them together. The wire 16, on the side of electrode 10 opposite the washer 17, is covered with insulation 19 in a conventional manner.

A plug 20 formed from insulating material carries a pair of contact prongs 21 and 22 extending from one end of the plug 20 in a conventional manner. The wire 16 is connected to the prong 21 by means of a screw 23 to electrically connect the wire 16 thereto. The prong 22 is unconnected and remains electrically dormant.

A wooden handle 24 is provided for the electrode 10 and carries a bore 25 extending inwardly from one end to receive the electrode 10. A square bore 26 extends transversely of the handle 24 and communicates with the bore 25. A short bore 27, axially aligned with the bore 25, extends into the handle 24 on the side of square bore 26 opposite to the bore 25. A bore 28 extends from the central portion of the end of handle 24 opposite the bore 25 to the bore 26 at one end thereof, bore 28 being in communication with the bore 26.

A rubber insulating hand grip 29 is formed hollow to receive the handle 24 therein. The hand grip 29 is substantially closed, as at 30, at one end with a bore 31 to permit passage of the wire 16 with its insulation 19.

The electric bait getter comprising the invention is assembled and operated as follows: The nut 14 is positioned in the bore 26 with the threaded opening thereof axially aligned with the bore 25. The electrode 10 is inserted in the bore 25 with the screw-threaded portion 12 innermost, and the rod is screwed through the nut 14 which is held against rotation by the walls of the square bore 26. The electrode 10 is screwed through the nut 14 until the end 33 of the electrode 10 comes in contact with the bottom 34 of the bore 27. Thus, the electrode 10 is clamped in the handle 24 against movement in either direction. The wire 16 is then inserted in the bore 15 and the washer 17 is soldered as at 18 to the end of the wire 16 to support the wire 16 in the electrode 10. The hand grip 29, which had been previously threaded onto the wire 16, is then telescoped over the handle 24 covering the ends of the bore 26, completely insulating the elements therein from the hand of the user. The electrode 10 is inserted in the ground after the plug 20 has had its prongs 21 and 22 inserted in an electric outlet (not shown).

In the case of the operation of the device, a degree of vibration will be felt while current is flowing therethrough. Should the polarity of the prongs 21 and 22 be such that current does not flow through the meter, then the plug 20 is pulled from the receptacle and the prongs 21 and 22 reversed to connect the prong 21 to the opposite side of the circuit. Obviously the circuit through the wire 16 to the meter electrode 10 is completed through the ground.

Operation of the device creates an electric charge in the ground and causes animal life contained therein to seek the surface to escape the electric charge. Thus it can be seen that worms and other fish bait can be collected directly from the surface upon using the above-described getter.

Having thus described the preferred form of the invention, it should be understood that numerous structural modifications and adaptations may be resorted to without departing from the scope of the appended claim.

What is claimed is:

An electric bait getter comprising: a metallic electrode, a dielectric handle, a resilient dielectric grip encompassing said handle, said handle having a bore extending therein to support said electrode, a transverse bore extending through said handle, a nut seated in said transverse bore and engaged over said electrode securing said electrode in said first-named bore, said electrode bearing against said handle at its inner end to prevent inward movement of said electrode in said handle, an electric wire and means for connecting one end of said electric wire to said electrode including a bore in said electrode through which said wire extends, and a washer soldered to the free end of said wire.

References Cited in the file of this patent
UNITED STATES PATENTS

| 1,932,237 | Warner | Oct. 24, 1933 |
| 2,994,882 | Cadieux | Mar. 19, 1935 |
| 2,101,277 | Wappler | Dec. 7, 1937 |
| 2,176,994 | Hansen | Oct. 24, 1939 |

FOREIGN PATENTS

| 852,316 | Germany | Oct. 13, 1952 |